United States Patent
Ramakrishna et al.

(10) Patent No.: US 6,233,455 B1
(45) Date of Patent: May 15, 2001

(54) METHOD FOR UTILIZING NEGATIVE T_COMP TO IMPROVE HANDOFF RELIABILITY

(75) Inventors: Deepa Ramakrishna, Plano, TX (US); Ahmad Jalali, San Diego, CA (US); Ashvin Chheda, Dallas, TX (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/304,144

(22) Filed: May 3, 1999

(51) Int. Cl.[7] .................................................. H04Q 7/20
(52) U.S. Cl. ........................................ 455/437; 455/442
(58) Field of Search .................................. 455/436, 437, 455/442, 525; 370/331

(56) References Cited

U.S. PATENT DOCUMENTS 6,055,428 * 4/2000 Soliman ............................... 455/437

* cited by examiner

*Primary Examiner*—Nguyen T. Vo
(74) *Attorney, Agent, or Firm*—John D. Crane; Bracewell & Patterson, L.L.P.

(57) ABSTRACT

A pre-determined negative constant is utilized in soft handoff mode to permit a new pilot signal to be added to an wireless phone's active set. The negative constant is combined with the weakest pilot signal in the active set and then compared to the new pilot signal strength which allows the new pilot to trigger a Pilot Strength Measurement Message (PSMM) even when the new pilot signal is weaker than all active set pilot signals. The negative constant provides a soft handoff while maintaining or reducing drop rate probabilities and frame error rates. After initially triggering a PSMM, the next instance the new pilot may ordinarily cause a PSMM to be triggered is when the new pilot signal exceeds the strongest active set pilot signal. Triggering a PSMM when exceeding the strongest active set signal may increase the probability of dropped signals. To reduce the probability of dropped signals, a negative constant is utilized during soft handoff to add a new pilot to an active set. This step would also decrease the probability that the new pilot will overpower a weaker active set pilot signal.

24 Claims, 7 Drawing Sheets

METHOD FOR UTILIZING NEGATIVE T_COMP TO IMPROVE HANDOFF RELIABILITY

BACKGROUND OF THE INVENTION

1. Technical Field

The present invention relates in general to wireless communication systems and in particular to wireless systems utilizing Code Division Multiple Access ("CDMA"). More particularly, the present invention relates to maximizing sector capacity of a given system by improving call drop probability. Still more particularly, the present invention relates to improving soft handoff.

2. Description of the Related Art

CDMA, as specified by CDMA standard IS95, is a form of digital cellular phone service and generally offers increased capacity over other types of digital cellular phone service. Each phone call is combined with a code that is broadcast across a broad frequency spectrum and another phone, which is aware of the code, receives the signal among all the other signals that may be occupying that frequency band. By coding the signal so that only one phone may receive the signal, more transmissions on the same band are allowable. Each cell may be partitioned, by directional antennas, into a number of sectors. Sectors may have different pilot signals and users and resources are shared by the multiple sectors within a cell.

CDMA power requirements represent both an advantage and a disadvantage to the system. In CDMA, strong signals overpower weak signals because the noise level is raised at the base station demodulators to accommodate the strong signal. The noise level problem is somewhat overcome by power control. The base station samples signal strength indicators of each mobile and sends a power change command to the mobiles increasing or decreasing the power requirement as a function of the grade of service requirement. This causes a nearby, strong mobile to decrease its power output and a mobile with a weak signal to increase its power output.

CDMA also provides a feature called "soft handoff." "Hard handoff," as opposed to soft handoff, is the process a wireless phone (mobile or handset) goes through as it approaches the boundary of a new cell. The network automatically drops resources in the current cell and hands off the connection to the new cell the mobile may be entering. Soft handoff allows a mobile to maintain resource connections with multiple base stations while moving within a system, adding and dropping connections as necessary.

IS95 (digital CDMA standard for U.S. cellular radio systems) soft handoff allows an individual handset to maintain a connection with as many as six individual pilot signals. As a mobile demodulates received information and sends modulated information, the mobile is constantly searching for pilot signals. A pilot signal (identifier channel, designated P1, P2, P3, etc.) broadcast from each sector of each base station (fixed station for communication between a network and mobiles within base station cells), is unique to that sector and is identified with a unique code—a PSEUDO NOISE ("PN") sequence. If a handset ("mobile") detects a new pilot, not yet in communication with the mobile, whose pilot strength (carrier to total interference ratio) is above an upper signal strength threshold (T_ADD), it will send a Pilot Strength Measurement Message ("PSMM") to the network via the sector(s) base station with which it is currently communicating. The PSMM is sent to request that this new sector be added to the mobile's "active set" (a set, on board the mobile and network containing sectors that are currently in communication with the mobile). The network will instruct the mobile to add this new pilot via a Handoff Direction Message (HDM) sent out by all the sectors in the mobile's current active set. The HDM includes parameter settings based on changes in signal strengths, number of pilots in an active set and new parameter values introduced by the system operator. The mobile, on receiving the message, will add this new sector to the active set utilizing the parameters provided in the HDM and acknowledge via a third message, the Handoff Completion Message (HCM). If the mobile detects that a current, active set pilot signal strength (carrier to total received signal ratio) has dropped below a certain lower signal strength threshold (T_DROP) and has remained below that threshold for a pre-determined period of time (T_TDROP), then a PSMM is sent to the network, requesting that such a sector be dropped from the active set. The HDM and HCM follow in order as explained above. Upon receiving the HCM, the network acknowledges the HCM by sending a BSAO (Base Station Acknowledgment Order).

If a PSMM is sent by a mobile requesting addition of a particular pilot into the mobile's active set, the network may choose not to add such a Pilot. In order to reduce excessive messaging back and forth, the network may not send an HDM because the mobile would just resend the PSMM. However, the network must acknowledge the PSMM to prevent the mobile from continuously sending the PSMM. In such cases, the network acknowledges the PSMM with a Base Station Acknowledgment Order (BSAO), but doesn't send the HDM. This action prevents the mobile (standard action) from sending a PSMM requesting addition of this particular pilot again, until the pilot exceeds the strength of the current, weakest active set pilot by a factor "T_COMP" (T_COMP is an assigned value for triggering a decision by the network to add a new channel to the active set. New pilot signals must exceed the weakest active set pilot signal plus T_COMP. The IS95 standard requires T_COMP to take on positive values.). As the new pilot exceeds T_COMP (plus weakest signal), a completely new PSMM will be triggered. If the message is again ignored (BSAO sent, not HDM), then another PSMM will be sent only if this particular pilot exceeds the weakest pilot in the active set by T_COMP. Keep in mind that should anything else change, i.e. another pilot needing entry to the active set or a current active set ready to drop a pilot, a subsequent PSMM will be sent.

In an active set, as indicated before, there may be as many as six sectors allocating resources for an individual handset. For example, a mobile may have an active set of P1, P2, P3, and a new pilot, i.e., P4 may be increasing in strength so much so (mobile is in motion within cells causing pilots in an active set to change strength) that P4 equals or exceeds P3. Consequently P4's signal strength generates interference with P3. T_COMP should be set so that a PSMM is triggered when the signal to noise ratio is such that the mobile would be dropped from the system because of too much interference. Another way to add a new pilot is that if a current, active set pilot, P3, drops below T_Drop (a system specified arbitrary value) for a specified time period (T_TDROP), usually four seconds, a PSMM is triggered. The PSMM requests the removal of the sector from the active set because the pilot C/I (carrier to total interference ratio) dropped below T_Drop for T_TDrop seconds. The HDM and HCM follow in order as explained above Referring now to FIG. 4A, a graph illustrating signal strength of P3, as received by a mobile, is illustrated. P3 400 is a pilot signal increasing in strength as the mobile moves within the system. An active set (not shown), consisting of P1 and P2, will be considering P3 400 as a candidate for the active set. As the mobile moves closer to P3, T_ADD 402 is reached (−6 db from P2, the weaker signal in the active set) and a PSMM is sent to a base station. In this instance, P3 is not added because Delta_3 (arbitrary value for three pilots in an active set, set by the system) condition is not met, and P3 continues to increase in strength to −8 db which is the signal strength of P2. If the mobile continues moving towards P3, the next PSMM to be sent will be PSMM 404. The signal strength of P3 when PSMM 404 is sent, meets or exceeds T_COMP 406 (including weakest signal strength) which is the trigger for PSMM 404.

Referring to FIG. 4B, a chart illustrating constants required to add and drop pilot signals to an active set, is depicted. As previously discussed, a signal increasing in strength passes through certain thresholds that permit addition of a pilot signal to an active set and also permit dropping a pilot from the active set. T_ADD 410 is reached by P3 and P3 is added to the active set. After a period of decreasing signal strength, the signal strength of P3 falls through T_DROP 412. T_DROP 412 threshold is a trigger point that starts measuring the period of time P3 remains below T_DROP 412. If the signal remains below T_DROP 412 a predetermined period of time (usually 4 seconds), T_TDROP 414 causes the signal to be dropped from the mobile's active set.

A mobile may demodulate a maximum number of received transmission paths, usually three. Consequently, the mobile will attempt to demodulate the three highest quality paths from any of the links at any instant in time (this changes as radio frequency conditions change). By demodulating three channels simultaneously, probability increases that signal reception is clear and soft handoff would maintain continuity when moving between cells. A problem with high handoff rate is that system capacity is sacrificed, as there are sectors having to transmit (including those in the active set) even though the mobile is demodulating from other sectors. Optimal handoff is required to maintain frame error rates (invalid frame, or packet, identified by the Cyclic Redundancy Check sent with each frame) and dropped call (mobile permanently disconnected from the system during communication) probabilities below selected targets by providing a diversity of signal paths to the mobile.

All base stations are expending power transmitting to mobiles that are active within the system. Where a mobile active set contains six pilot channels, there are six sectors expending power maintaining radio connection with the mobile. Therefore, it would be desirable to increase efficiency of the network by providing a method and apparatus for assisting soft handoff between a mobile (or sectors) and base-stations while maintaining low dropped call probabilities and without adversely affecting frame error rates.

SUMMARY OF THE INVENTION

It is therefore one object of the present invention to provide a method and apparatus that will allow soft handoff in a CDMA system to operate more efficiently than prior systems and improve capacity.

It is another object of the present invention to provide a method and apparatus that will improve soft handoff while maintaining low call drop rate probabilities and frame error rates.

The foregoing objects are achieved as is now described. A pre-determined negative constant is utilized in soft handoff mode to permit a new pilot signal to be added to an wireless phone's active set. The negative constant is combined with the weakest pilot signal in the active set and then compared to the new pilot signal strength which allows the new pilot to trigger a Pilot Strength Measurement Message (PSMM) even when the new pilot signal is weaker than all active set pilot signals. The negative constant provides a soft handoff while maintaining or reducing drop rate probabilities and frame error rates. After initially triggering a PSMM, the next instance the new pilot may ordinarily cause a PSMM to be triggered is when the new pilot signal exceeds the strongest active set pilot signal. Triggering a PSMM when exceeding the strongest active set signal may increase the probability of dropped signals. To reduce the probability of dropped signals, a negative constant is utilized during soft handoff to add a new pilot to an active set. This step would also decrease the probability that the new pilot will overpower a weaker active set pilot signal.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
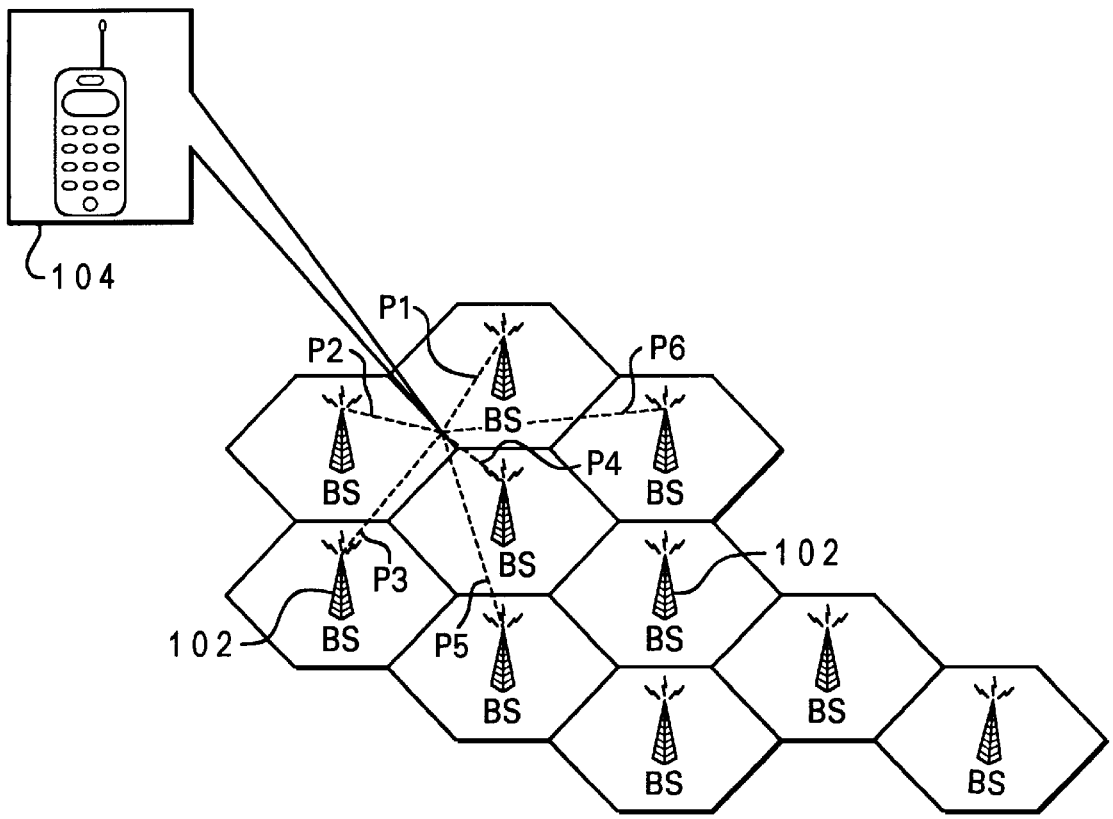
FIG. 1 depicts a high-level block diagram of a wireless cellular telephone system in which a preferred embodiment of the present invention may be implemented.

With reference now to the figures, and in particular with reference to FIG. 1, a high-level block diagram of a CDMA wireless communication system in which a preferred embodiment of the present invention may be implemented, is depicted. System 100 comprises multiple Base Stations (BS) 102, each BS servicing and in communication with multiple mobile terminals (MTs) 104. Each BS 102 has an associated Mobile Service Center (MSC) (not shown). In a typical wireless communication system 100, there are multiple MSCs and multiple BSs 102 serviced by each MSC. For purposes of clarity and illustration of the present invention, there is shown in FIG. 1, multiple BS cells and a single MT 104. Each BS 104 generates a pilot signal and the six pilots in the active set are represented by P1, P2, P3, P4, P5, and P6. The pilot signals are received into MT 104 and maintained in the active set on board MT 104 and the network.

P1, P2, P3, P4, P5, and P6 are all pilot signals that are broadcast from the subject BSs 102 and each one represents one sector of each transmitting BS 102. MT 104 is receiving six pilot signals (signals (P1, P2, etc.) of varying strength. As MT 104 moves about the area, each signal changes signal strength and MT 104 may drop and add signals according to pre-defined criteria, usually dependent on pilot signal strength.

Figure 2A:
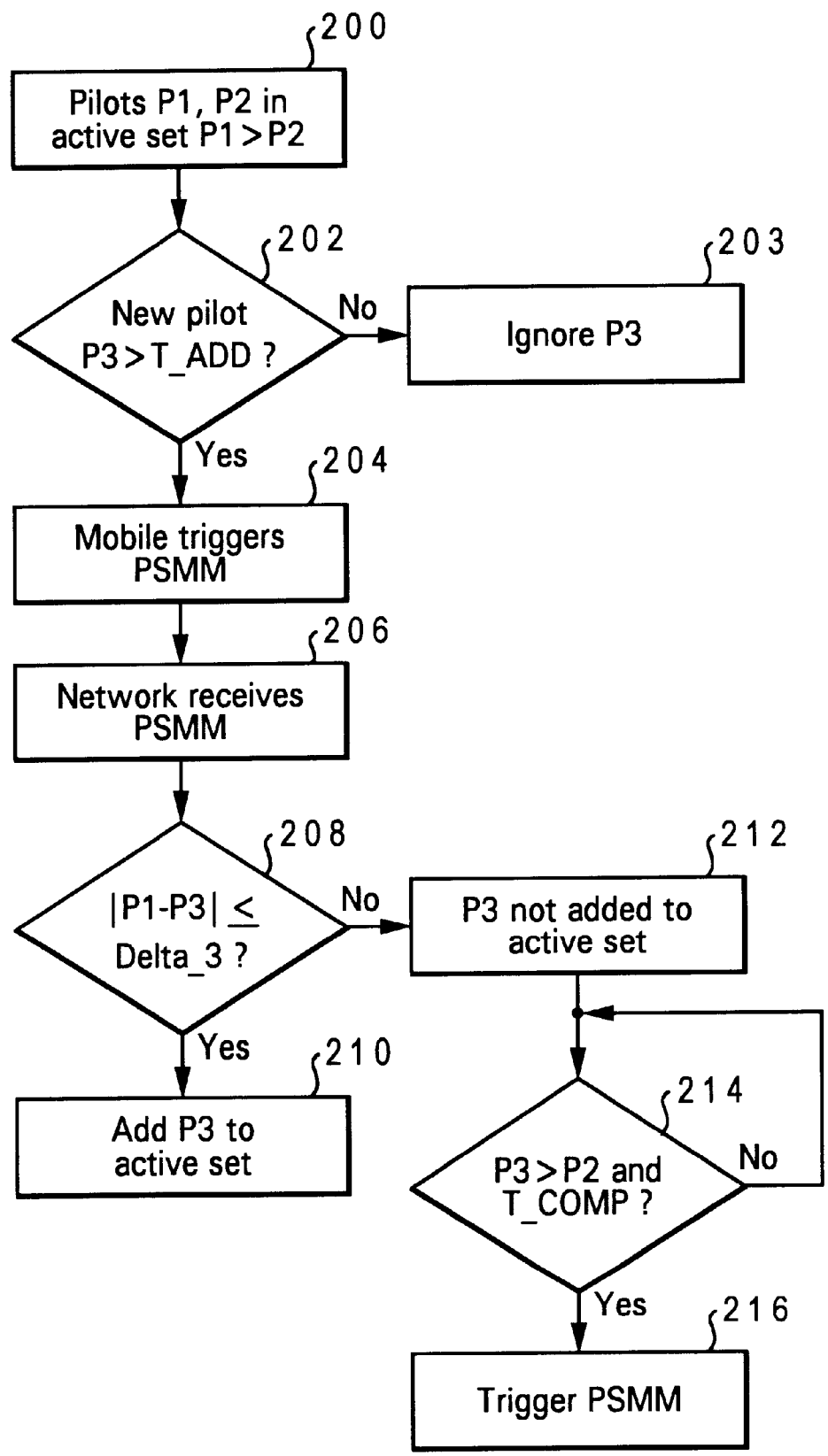
FIG. 2A illustrates a high-level flow diagram of a method utilizing negative T_COMP to reduce the probability of dropped connections, in accordance with a preferred embodiment of the present invention.

Referring now to FIG. 2A, a high-level flow diagram of a method utilizing negative T_COMP to reduce the probability of dropped connections, in accordance with a preferred embodiment of the present invention, is depicted. The process begins in step 200, which depicts two strong pilot signals in the active set with P1 having a stronger signal strength than P2. A new signal, P3, is increasing in strength and approaching the strength of signal P2. The process then passes to step 202 which depicts a determination of whether P3 is of greater strength than T_ADD. If P3 is not stronger than T_ADD, the process proceeds to step 203, which depicts the network ignoring P3. If P3 is stronger than T_ADD, the process passes instead to step 204, which illustrates the mobile sending a PSMM. If the new pilot signal, P3, exceeds T_ADD, the process then passes to step 206, which depicts the network receiving the PSMM.

Next, the process passes to step 208, which depicts a determination of whether the absolute value of the difference between the strongest signal in the active set, P1, and the new signal, P3, is less than or equal to Delta_3 (an arbitrary value relating the strongest signal to the weakest signal in the active set, set by the system operator). If so, the process continues to step 210, which illustrates adding P3 to the active set. If the absolute value of the difference between the strongest signal in the active set, P1, and the new signal, P3, is not less than or equal to Delta_3, the process proceeds instead to step 212, which depicts P3 not being added to the active set.

Further, the process continues to step 214, which depicts a determination of whether P3 is greater than P2 plus T_COMP. If T_COMP is a positive value, as in the soft handoff algorithm depicted in FIGS. 3A–3B, P3 must exceed P2 by T_COMP in order to trigger the PSMM. As discussed earlier, the increasing strength of P3, without being added to the active set may cause interference and a signal to noise ratio that could cause the mobile to be dropped from the system. However, if T_COMP has a negative value, as in the present invention, P3 only has to approach the signal strength of P2 to trigger the PSMM, thereby reducing the probability of a dropped signal. If, in step 214, P3 is not of a greater signal strength than P2 plus T_COMP (T_COMP is a negative value), the process returns to step 214 and repeats until P3 is added to the set (signal continues to increase in strength) or is dropped from contention (signal grows weaker). If in step 214, P3 is greater than P2 plus T_COMP, the process continues to step 216, which illustrates the mobile triggering a PSMM for adding P3 to the active set.

Figure 2B:
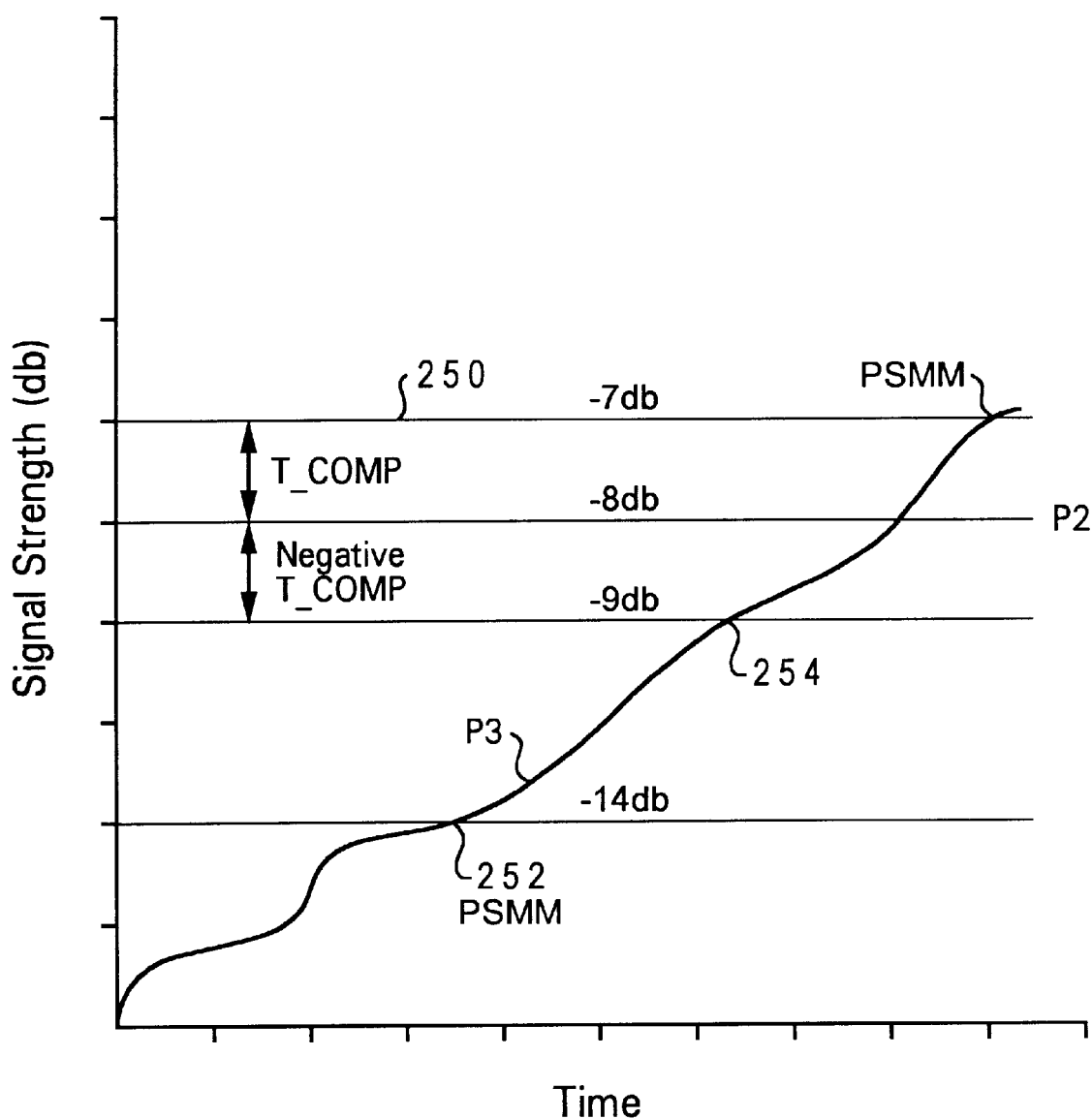
FIG. 2B depicts a graphical representation of a negative T_COMP method for improving handoff reliability in a preferred embodiment of the present invention.

Referring to FIG. 2B, a graphical representation of a negative T_COMP method for improving handoff reliability in a preferred embodiment of the present invention, is depicted. Signal strength of P3, as received by a mobile, is illustrated as increasing over a period of time. The first instance that PSMM may be sent is T_ADD, at −14 db 252. P3 would likely not be added to the active set of the mobile at this strength. As the signal increases in strength, requirement for P3 to be less than Delta_3 has been reached. Regularly, the next threshold to reach would be T_COMP 250. However, utilizing negative T_COMP 254, P3 may be added to the active set before becoming too strong and possibly causing the mobile to be dropped from the system.

Providing a "buffer" threshold constant, such as negative T_COMP, allows a CDMA wireless system to add signals to a mobile's active set at a point that reduces the incidence of high signal to noise ratio. Negative T_COMP provides an insertion point that will not threaten stability of the active set as much as positive T_COMP does.

Figure 3A:
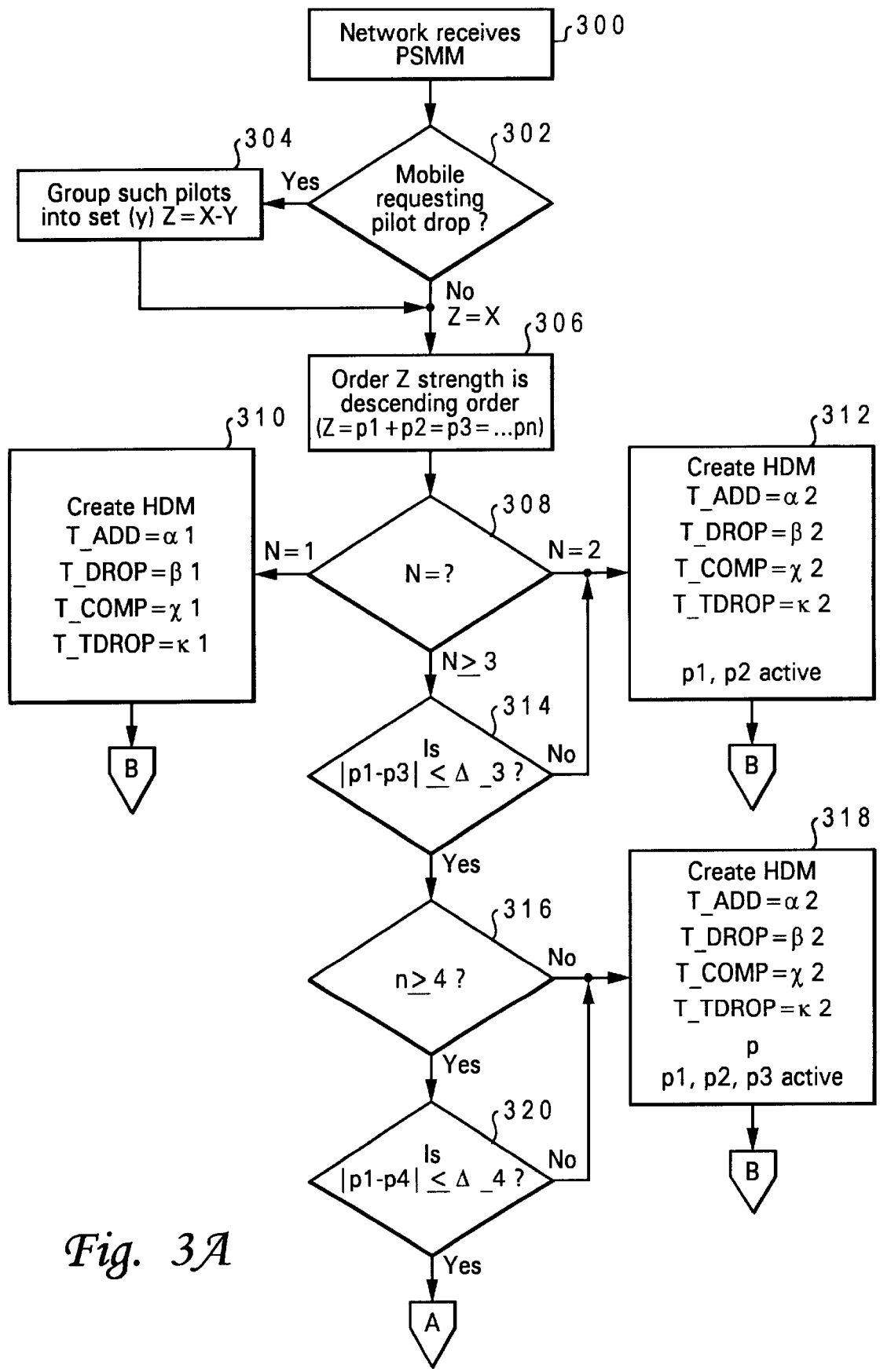
FIGS. 3A–3B illustrates a high-level flow diagram of a method for improving soft handoff reliability, in accordance with a preferred embodiment of the present invention.
Figure 3B:
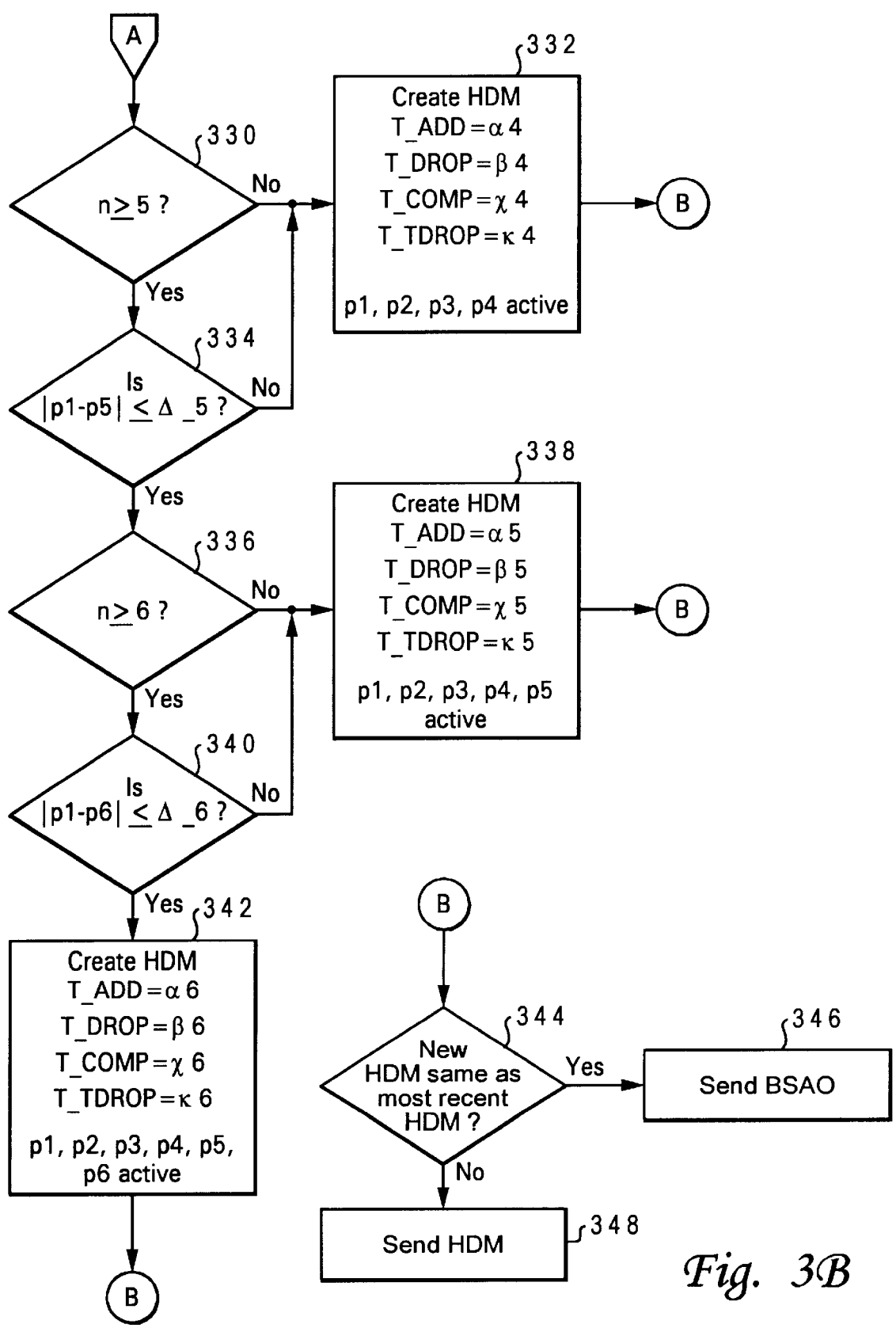
Figure 4A:
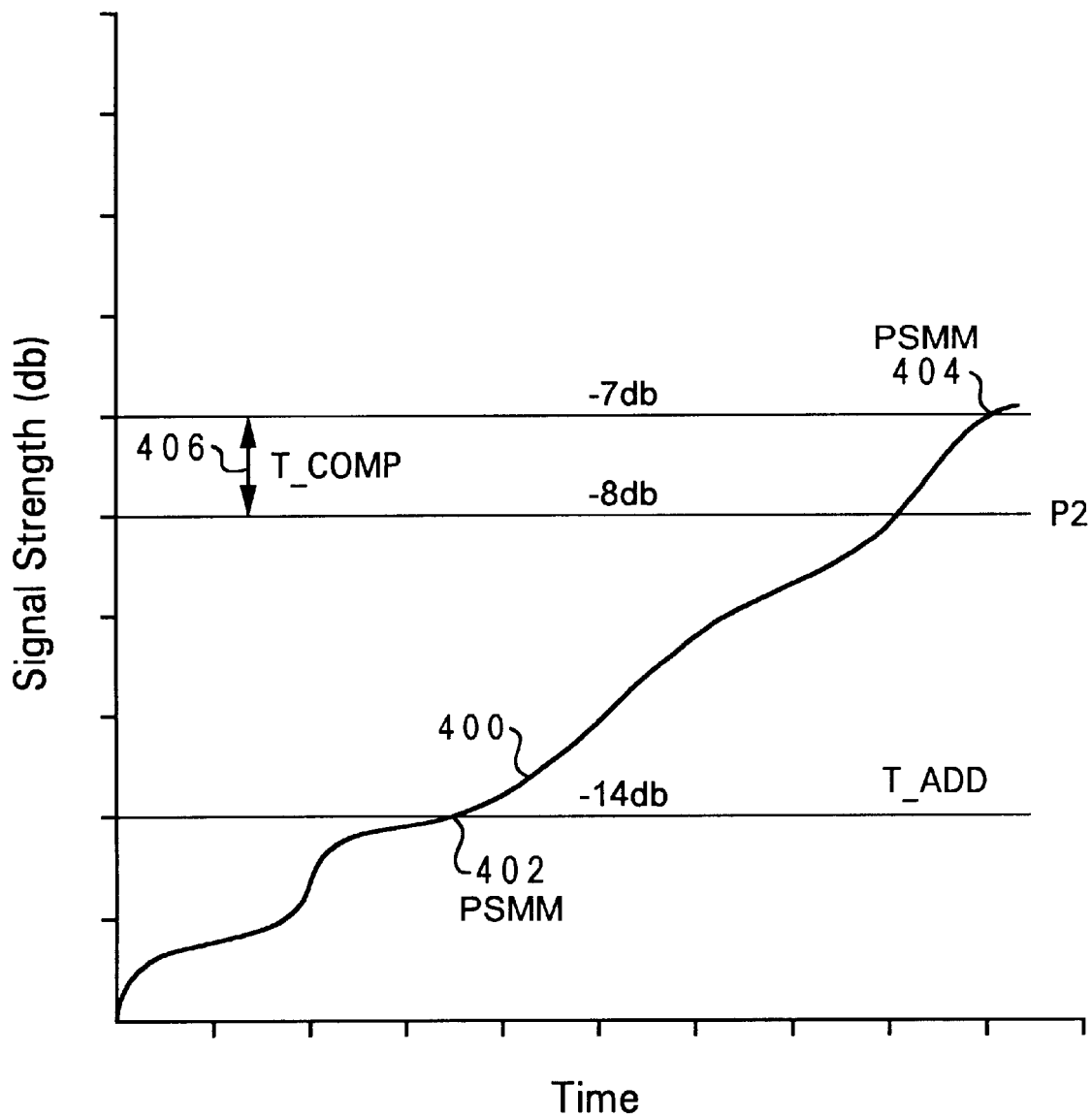
FIGS. 4A–4B illustrate constants utilized in determining when to add a pilot signal to an active set.
Figure 4B:
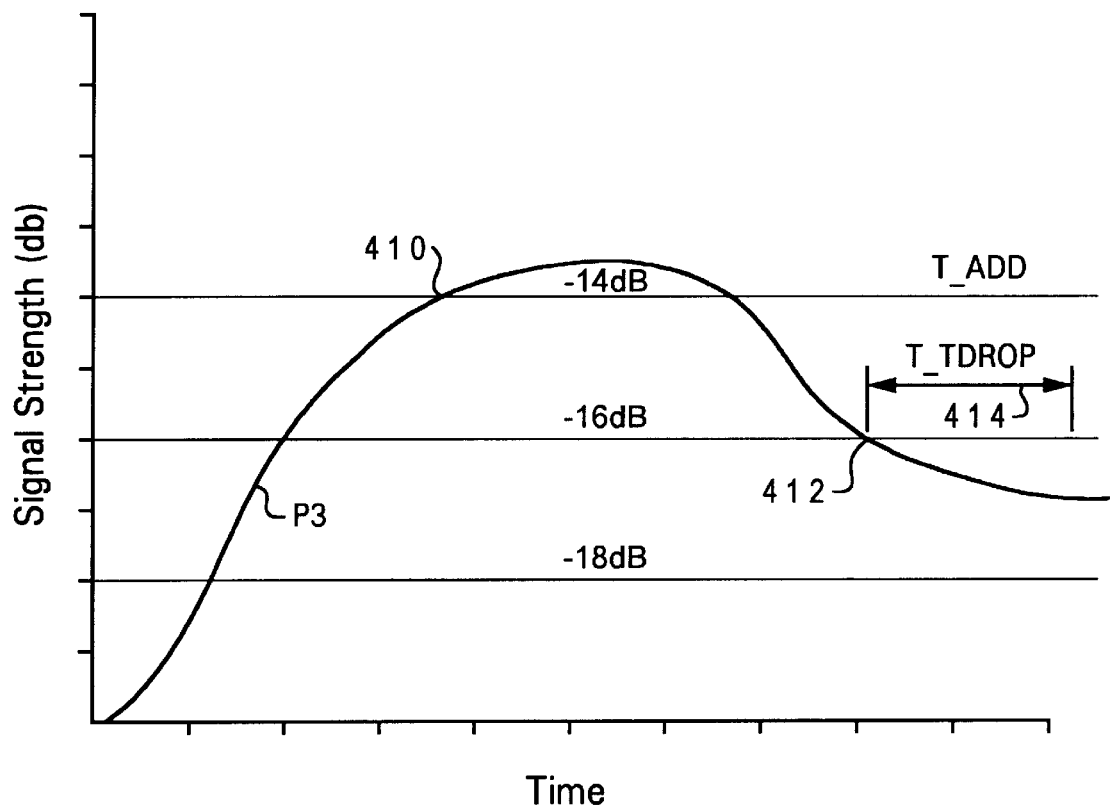

With reference now to FIGS. 3A–3B, a high-level flow diagram of a method for improving soft handoff reliability, in accordance with a preferred embodiment of the present invention, is depicted. As a mobile (in a CDMA network) moves about in a region of coverage, the mobile will soft handoff from one sector (divisions within a cell) to another. The mobile demodulates received information, transmits modulated signals and searches for other pilot signals in neighboring sectors. If the mobile detects a new pilot with pilot strength above a threshold (T_ADD), the mobile places the new signal in a candidate set and sends a Pilot Strength Measurement Message (PSMM) to the Base Station (BS). The PSMM requests entry of the detected signal into the mobile's active set and the network sends a Handoff Direction Message (HDM), transmitted by all the active sectors in the active set, to add the new pilot.

The process begins with step 300, which depicts the network receiving a PSMM signal providing the active set of a mobile and a candidate signal for addition to the active set. The process passes to step 302, which illustrates a determination by the network whether the mobile is requesting to drop any pilot signal. If so, the process proceeds to step 304, which depicts the network grouping pilots to be dropped into a set Y. Z represents the active set (X) less pilots to be dropped (Y). The process proceeds on to step 306. Returning to step 302, if the determination is made that no pilots are to be dropped, the process passes instead to step 306.

The process continues to step 306, which illustrates ordering the active set pilot signals in descending order of strength. Each pilot signal in both the active set and a candidate set is ranked from the strongest to the weakest. The process next passes to step 308, which depicts a determination of the number of pilot signals being demodulated within the process. The process then proceeds to step 310 or step 312, which illustrate the network creating a HDM with a change in T_ADD, T_DROP, T_COMP and T_TDROP. If the number of pilot channels in the active set is one, the process passes to step 310, which illustrates the network creating a HDM with changes to the parameter values associated with one pilot signal. If the number of pilot channels in the active set is two, the process proceeds instead to step 312, which depicts the network creating a HDM with new constant values as in step 310.

From either of steps 310 or 312, the process next passes to step 344, in FIG. 3B, which is a determination of whether the new HDM is the same as the most recent previously sent HDM. If so, the process passes to step 346, which depicts the network sending a BSAO to prevent the mobile from continuously sending a PSMM. If the new HDM is not the same, the process passes instead to step 346, which illustrates the network sending the new HDM.

Returning to step 308 in FIG. 3A, if the number of pilot signals is greater than or equal to three, the process proceeds instead to step 314, which depicts a determination of whether the absolute value of the difference of signal strengths of P1 and P3 is less than or equal to Delta_3 (arbitrary value set by the system operator based on having three pilots in the active set). If the difference is more, the process passes to step 312, described above. If the difference is less than or equal to Delta_3, the process proceeds instead to step 316, which illustrates a determination of whether there are four or more pilot signals in the active set. If not, the process passes to step 318, which depicts the network creating an HDM with a change in parameters T_ADD, T_DROP, T_COMP and T_TDROP (described above). The process then continues, as from step 310 and step 312, to step 344 in FIG. 3B.

Returning to step 316, if instead there are four or more pilot signals within the active set, the process continues to step 320, which illustrates a determination of whether or not the absolute value of the difference between the strongest pilot P1, and the weakest pilot P4 is less than or equal to Delta_4 (an arbitrary value set by the system operator based on having 4 pilots in the active set). If the absolute value is not less than Delta_4, the process proceeds to step 318. If the value is less than Delta_4, the process proceeds instead to step 330 in FIG. 3B.

Referring now to FIG. 3B, a continuation of the process to minimize soft handoff in accordance with a preferred embodiment of the present invention is illustrated. The process continues from step 320 to step 330, which illustrates a determination of whether there are five or more pilot signals in the active set. If not, the process passes to step 332, which depicts the network creating an HDM with a change in T_ADD, T_DROP, T_COMP and T_TDROP (the parameters are different based on, among other things, the number of pilots included in the active set). The process then continues to step 344.

Returning to step 330, if instead there are five or more pilot signals within the active set, the process continues to step 334, which illustrates a determination of whether or not the absolute value of the difference between the strongest pilot P1, and the weakest pilot P5 is less than or equal to Delta_5 (an arbitrary value set by the system operator based on having multiple pilots in the active set). If the absolute value is not less than Delta_5, the process proceeds to step 332. If the value is less than Delta_5, the process proceeds instead to step 336, which illustrates a determination of whether there are six or more pilot signals in the active set. If not, the process passes to step 338, which depicts the network creating an HDM with a change in T_ADD, T_DROP, T_COMP and T_TDROP. The process then continues to step 344.

Returning to step 336, if instead there are six or more pilot signals within the active set, the process continues to step 340, which illustrates a determination of whether or not the absolute value of the difference between the strongest pilot P1, and the weakest pilot P6 is less than or equal to Delta_6 (an arbitrary value set by the system operator based on having six pilots in the active set). If the absolute value is not less than Delta_6, the process proceeds to step 338. If the value is less than or equal to Delta_6, the process proceeds instead to step 342, which depicts the network creating an HDM with a change in T_ADD, T_DROP, T_COMP and T_TDROP. The process then continues to step 344.

Delta values are utilized to set upper and lower limits to qualify a new pilot for admittance to an active set. The strongest pilot signal strength is an upper limit and the weakest pilot signal strength is the lower limit. If a new pilot is requesting entry to the active set, it must meet or exceed the strength of the current weakest pilot included in the active set. Delta is a value determined by subtracting the weakest current active pilot from the strongest active pilot. The new pilot signal strength is subtracted from the strongest active set pilot signal to determine whether the new pilot exceeds the signal strength of the weakest active set pilot signal strength.

It is important to note that while the present invention has been described in the context of a CDMA wireless network employing a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for improving soft handoff reliability, comprising:

combining a pre-determined negative constant with a signal strength of a weakest pilot signal within an active set of pilot signals to obtain a result lower than the signal strength of the weakest pilot signal;

comparing the result with a signal strength for a new pilot signal not part of the active set;

if the result is less than or equal to the signal strength of the new pilot signal, initiating a message for adding the new pilot signal to the active set.

2. The method of claim 1, further comprising:

receiving a request for entry of the new pilot signal into the active set;

determining individual signal strengths of all pilot signals in the active set;

determining individual signal strengths of all pilot signals in a candidate set of pilot signals, wherein the candidate set includes the new pilot signal; and ranking the signal strengths from weakest to strongest in both the active and candidate sets.

3. The method of claim 1, further comprising:

determining a first constant by subtracting the signal strength of the weakest pilot signal within the active set from a signal strength of a strongest pilot signal within the active set;

subtracting the signal strength for the new pilot signal from the signal strength of the strongest pilot signal within the active set to obtain an outcome;

comparing the first constant to an absolute value of the outcome; and adding the new pilot signal to the active set if the absolute value of the outcome is less than or equal to the first constant.

4. The method of claim 1, wherein the step of combining the pre-determined negative constant with a signal strength of a weakest pilot signal within an active set of pilot signals to obtain a result lower than the signal strength of the weakest pilot signal further comprises:

detecting the new pilot signal, wherein the new pilot signal is not included in the active set and is increasing in strength.

5. The method of claim 4, further comprising:

determining a factor by subtracting the signal strength of the new pilot signal from a signal strength of a strongest pilot signal in the active set; and comparing the factor to a second pre-determined constant.

6. The method of claim 5, further comprising:
if the factor is less than or equal to the second constant, adding the new pilot signal to the active set.

7. The method of claim 1, further comprising:
in determining whether to drop the weakest pilot signal from the active set,
computing a difference between the signal strength of the weakest pilot signal and a signal strength of a strongest pilot signal within the active set;
comparing an absolute value of the difference to a predefined amount;
responsive to determining that the absolute value of the difference exceeds the predefined amount, dropping the weakest pilot signal from the active set and recalculating parameters for the active set of pilot signals;
determining whether any parameters for the active set of pilot signals have changed;
if any parameter for the active set of pilot signals has changed, sending a message with all parameter changes to all pilot sectors having a pilot signal in the active set; and
if no parameter for the active set of pilot signals has changed, acknowledging a message requesting addition of the new pilot signal to the active set in order to prevent further requests.

8. The method in claim 1, wherein the step of initiating a message for adding the new pilot signal to the active set further comprises:
requesting entry of the new pilot signal into the active set;
sending a first message to all pilot sectors having a pilot signal in the active set to add the new pilot;
adding the new pilot to the active set; and
receiving a second message acknowledging the first message.

9. An apparatus for improving soft handoff reliability, comprising:
means for combining a pre-determined negative constant with a signal strength of a weakest pilot signal within an active set of pilot signals to obtain a result lower than the signal strength of the weakest pilot signal;
means for comparing the result with a signal strength of a new pilot signal not part of the active set;
means, responsive to the result being less than or equal to the signal strength of the new pilot signal, for initiating a message for adding the new pilot signal to the active set.

10. The apparatus of claim 9, further comprising:
means for receiving a request for entry of the new pilot signal into the active set;
means for determining individual signal strengths of all pilot signals in the active set;
means for determining individual signal strengths of all pilot signals in a candidate set of pilot signals, wherein the candidate set includes the new pilot signal; and
means for ranking the signal strengths from weakest to strongest in both the active and candidate sets.

11. The apparatus of claim 9, further comprising:
means for determining a first constant by subtracting the signal strength of the weakest pilot signal within the active set from a signal strength of a strongest pilot signal within the active set;
means for subtracting the signal strength of the new pilot signal from the signal strength of the strongest pilot signal within the active set to obtain an outcome;
means for comparing the first constant to an absolute value of the outcome; and
means for adding the new pilot signal to the active set if the absolute value of the outcome is less than or equal to the first constant.

12. The apparatus of claim 9, wherein the means for combining the pre-defined negative constant with a signal strength of a weakest pilot signal within an active set of pilot signals to obtain a result lower than the signal strength of the weakest pilot signal further comprising:
means for detecting the new pilot signal, wherein the new pilot signal is not included in the active set and is increasing in strength.

13. The apparatus of claim 12, further comprising:
means for determining a factor by subtracting the signal strength of the new pilot signal from a signal strength of a strongest pilot signal in the active set; and
means for comparing the factor to a second pre-determined constant.

14. The apparatus of claim 13, further comprising:
means for adding the new pilot signal to the active set if the factor is less than or equal to the second constant.

15. The apparatus of claim 9, further comprising:
means employed in determining whether to drop the weakest pilot signal from the active set, including:
means for computing a difference between the signal strength of the weakest pilot signal and a signal strength of a strongest pilot signal within the active set;
means for comparing an absolute value of the difference to a predefined amount;
means, responsive to determining that the absolute value of the difference exceeds the predefined amount, for dropping the weakest pilot signal from the active set and recalculating parameters for the active set of pilot signals;
means for determining whether any parameters for the active set of pilot signals have changed;
means, responsive to any parameter for the active set of pilot signals having changed, for sending a message with all parameter changes to all pilot sectors having a pilot signal in the active set; and
means, responsive to no parameter for the active set of pilot signals having changes, for acknowledging a message requesting addition of the new pilot signal to the active set in order to prevent further requests.

16. The apparatus in claim 9, wherein means for initiating a message for adding the new pilot signal to the active set further comprises:
means for requesting entry of the new pilot signal into the active set;
means for sending a first message to all pilot sectors having a pilot signal in the active set to add the new pilot;
means for adding the new pilot to the active set; and
means for receiving a second message acknowledging the first message.

17. A program of instructions for a telecommunications device within an instruction bearing medium for improving soft handoff reliability, comprising:
instructions within the instruction bearing medium for combining a pre-determined negative constant with a signal strength of a weakest pilot signal within an active set of pilot signals to obtain a result lower than the signal strength of the weakest pilot signal;
instructions within the instruction bearing medium for comparing the result with a signal strength of a new pilot signal not part of the active set;

instructions within the instruction bearing medium for initiating a message for adding the new pilot signal to the active set if the result is less than or equal to the new pilot signal strength.

18. The program of instructions of claim 17, further comprising:

instructions within the instruction bearing medium for receiving a request for entry of the new pilot signal into the active set;

instructions within the instruction bearing medium for determining individual signal strengths of all pilot signals in the active set;

instructions within the instruction bearing medium for determining individual signal strengths of all pilot signals in a candidate set of pilot signals, wherein the candidate set includes the new pilot signal; and instructions within the instruction bearing medium for ranking the signal strengths from weakest to strongest in both the active and candidate sets.

19. The program of instructions of claim 17, further comprising:

instructions within the instruction bearing medium for determining a first constant by subtracting the signal strength of the weakest pilot signal within the active set from a signal strength of a strongest pilot signal within the active set;

instructions within the instruction bearing medium for subtracting the signal strength of the new pilot signal from the signal strength of the strongest pilot signal within the active set to obtain an outcome;

instructions within the instruction bearing medium for comparing a first constant to an absolute value of the outcome; and instructions within the instruction bearing medium for adding the new pilot signal to the active set if the absolute value of the outcome is less than or equal to the first constant.

20. The program of instructions of claim 17, wherein instructions for combining the pre-determined negative constant with a signal strength of a weakest pilot signal within an active set of pilot signals to obtain a result lower than the signal strength of the weakest pilot signal further comprises:

instructions within the instruction bearing medium for detecting the new pilot signal, wherein the new pilot signal is not included in the active set and is increasing in strength.

21. The program of instructions of claim 20, further comprising:

instructions within the instruction bearing medium for determining a factor by subtracting the signal strength of the new pilot signal from a signal strength of a strongest pilot signal in the active set; and instructions within the instruction bearing medium for comparing the factor to a second pre-determined constant.

22. The program of instructions of claim 21, further comprising:

instructions within the instruction bearing medium for adding the new pilot signal to the active set if the factor is less than or equal to the second constant.

23. The program of instructions of claim 17, further comprising:

instructions within the instruction bearing medium for determining whether to drop the weakest pilot signal from the active set by:

computing a difference between the signal strength of the weakest pilot signal and a signal strength of a strongest pilot signal within the active set;

comparing an absolute value of the difference to a predefined amount;

responsive to determining that the absolute value of the difference exceeds the predefined amount, dropping the weakest pilot signal from the active set and recalculating parameters for the active set of pilot signals;

determining whether any parameters for the active set of pilot signals have changed;

sending a message with all parameter changes to all pilot sectors having a pilot signal in the active set if any parameter for the active set of pilot signals has changed; and acknowledging a message requesting addition of the new pilot signal to the active set in order to prevent further requests if no parameter for the active set of pilot signals has changed.

24. The program of instructions of claim 17, wherein the instructions for adding the new pilot signal to the active set further comprise:

instructions within the instruction bearing medium for requesting entry of the new pilot signal into the active set;

instructions within the instruction bearing medium for sending a first message to all pilot sectors having a pilot signal in the active set to add the new pilot;

instructions within the instruction bearing medium for adding the new pilot to the active set; and instructions within the instruction bearing medium for receiving a second message acknowledging the first message.

* * * * *